(12) United States Patent
Zhou

(10) Patent No.: US 9,501,524 B2
(45) Date of Patent: Nov. 22, 2016

(54) SEARCHING AND DETERMINING ACTIVE AREA

(71) Applicant: Alibaba Group Holding Limited, Grand Cayman (KY)

(72) Inventor: Shitian Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 204 days.

(21) Appl. No.: 14/158,486

(22) Filed: Jan. 17, 2014

(65) Prior Publication Data
US 2014/0207795 A1   Jul. 24, 2014

(30) Foreign Application Priority Data

Jan. 18, 2013   (CN) .......................... 2013 1 0019989

(51) Int. Cl.
*G06F 17/30* (2006.01)

(52) U.S. Cl.
CPC ..... *G06F 17/30424* (2013.01); *G06F 17/3053* (2013.01)

(58) Field of Classification Search
CPC .................................... G06F 17/30241; G09B 29/006–29/007; G06Q 30/0201
See application file for complete search history.

(56) References Cited

U.S. PATENT DOCUMENTS

| | | | |
|---|---|---|---|
| 6,240,360 B1 | 5/2001 | Phelan | |
| 6,650,998 B1 | 11/2003 | Rutledge et al. | |
| 8,027,868 B1 * | 9/2011 | House | G06Q 30/0205 705/7.34 |
| 2002/0059273 A1 | 5/2002 | Morimoto et al. | |
| 2006/0148488 A1 | 7/2006 | Syrbe | |
| 2006/0247845 A1 | 11/2006 | Cera et al. | |
| 2009/0089149 A1 * | 4/2009 | Lerner | G01C 21/32 705/7.34 |
| 2009/0176509 A1 | 7/2009 | Davis et al. | |
| 2009/0187464 A1 * | 7/2009 | Bai | G06Q 30/0205 705/7.34 |

(Continued)

FOREIGN PATENT DOCUMENTS

WO   WO2011081912   7/2011

OTHER PUBLICATIONS

Understanding crime hotspot maps written by Melissa Burgess, NSW Bureau of Crime Statistics and Research-Bureau Brief, Issue paper No. 60, Apr. 2011.*

(Continued)

*Primary Examiner* — Robert Beausoliel, Jr.
*Assistant Examiner* — Hau H Hoang
(74) *Attorney, Agent, or Firm* — Lee & Hayes, PLLC

(57) ABSTRACT

The present disclosure discloses an example method and server for searching and determining an active area. A search request is received by a server. An active area corresponding to the search request is searched in accordance with the search request. Information of the active area is returned. According to the present techniques, the active area found by the server is determined objectively based on the obtained related information. The present techniques avoid increasing search times of the server, prevent waste of resources and bandwidth of the server, and improve the accuracy and reliability for searching the active area.

16 Claims, 9 Drawing Sheets

(56) References Cited

U.S. PATENT DOCUMENTS

| | | | |
|---|---|---|---|
| 2010/0063854 A1 | 3/2010 | Purvis et al. | |
| 2010/0105408 A1 | 4/2010 | Palmer et al. | |
| 2011/0170799 A1* | 7/2011 | Carrino | G06F 17/30241 382/285 |
| 2011/0181620 A1 | 7/2011 | Hung | |
| 2012/0214570 A1 | 8/2012 | Oakes et al. | |
| 2013/0148895 A1* | 6/2013 | Miller | G06K 9/0063 382/195 |
| 2013/0181993 A1* | 7/2013 | Herring | G06T 11/206 345/440 |
| 2013/0236106 A1 | 9/2013 | Chao et al. | |
| 2015/0186414 A1* | 7/2015 | Jones | G06F 17/30241 707/723 |

OTHER PUBLICATIONS

Exploring Crime Hotspots: Geospatial Analysis and 3D Mapping written by Markus Wolff, Proceedings REAL CORP 2009 Tagungsband, Apr. 22-25, 2009, pp. 147-156.*

Lamprianidis, et al., "Jeocrowd—Collaborative Searching of User-Generated Point Datasets", Proceedings of the 19th ACM Sigspatial International Conference on Advances in Geographic Information Systems, GIS '11, Nov. 1, 2011, New York, New York, pp. 509-512.

PCT Search Report and Written Opinion mailed Aug. 28, 2014 for PCT Application No. PCT/US14/12104, 14 Pages.

Qian, et al., "Clustering in Very Large Databases Based on Distance and Density", Journal of Computer Science and Technology, vol. 18, No. 1, Jan. 1, 2003, pp. 67-76.

Wang, et al., "STING: A Statistical Information Grid Approach to Spatial Data Mining", Proceedings of the 23rd VLDB Conference, Aug. 26-29, 1997, Athens, Greece, pp. 186-195.

\* cited by examiner

SEARCHING AND DETERMINING ACTIVE AREA

CROSS REFERENCE TO RELATED PATENT APPLICATIONS

This application claims foreign priority to Chinese Patent Application No. 201310019989.6 filed on 18 Jan. 2013, entitled "Method and Server for Searching and Determining Active Area," which is hereby incorporated by reference in its entirety.

TECHNICAL FIELD

The present disclosure is related to the Internet, and, more particularly, to a method and a server for searching and determining an active area.

BACKGROUND

With the development of electronic information industry, the use of an active area is becoming more and more popular. For example, a user may use the active area to quickly obtain local business information in real-time. The active area refers to an area that has relatively flourishing business activities such as an area with at least one of the following characteristics: a large customer flow, a large visitor number, convenience for shopping, a large transacting amount, and a large number of stores. As the active area can provide a great degree of convenience for the user with respect to living, entertainment, and working, the user generally expects to obtain information about the active areas of a city when the user first arrives at the city.

The conventional techniques of searching the active area are usually determined by the personal experiences of user, personal recommendation, or any other manual methods.

For example, the active area of the city may be determined by an administrator of a server. Specifically, the administrator selects and names the active area according to local information and his/her understanding, such as Wulin Plaza and Hefang Street in Hangzhou City, Wangfujing and Guomao in Beijing City. Then the administrator uploads information of the determined active area to the server. Thereafter, when the user performs a search, the server determines a matched active area in accordance with a search condition, and returns the matched active area to the user. FIG. 1 illustrates a manually determined range of an active area of Sanlitun of Beijing City.

The conventional techniques have some disadvantages.

The method for manually determining the active area is restricted by personal experiences. As the standards and understandings of the active area vary with respect to different persons, the determined active area may be partial. In addition, with the rapid development of the Internet and expansion of the city, the active area may often change. The method for manually determining the active area would cause large workload and low efficiency and its accuracy and reliability are also questionable.

When the manually determined active area does not meet the requirements or the expectations of the user, the user is forced to input another keyword and the server then executes another search. Thus, the conventional techniques increase a number of times that the users visit the server, a number of search times at the server, and waste the resources and bandwidth of the server.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a method and a server for searching and determining an active area to improve an accuracy and reliability for searching and determining the active area.

The present disclosure provides an example method for searching the active area. A server receives a search request. The server searches an active area matching the search request in accordance with the search request. The server returns information of the matched active area.

The present disclosure also provides an example method for determining the active area. A geographical area is divided into a plurality of grids. A target object and attribute information corresponding to the target object are obtained. The attribute information of the target object may include attribute geographical location information. A grid corresponding to the target object is determined in accordance with the geographical location. A respective popularity value of each grid is calculated in accordance with respective one or more target objects corresponding to a respective grid. A set of grids is determined in accordance with the popularity value of each grid and a distance between each grid. The active area is determined in accordance with the set of grids.

The present disclosure also provides an example server. The example server may include a receiving unit, a searching unit, and a returning unit. The receiving unit receives a search request. The searching unit searches an active area matching the search request in accordance with the search request. The returning unit returns information of the matched active area.

The present disclosure also provides another example server. The other example server may include a dividing unit, an obtaining unit, a first determining unit, a calculating unit, a second determining unit, and a forming unit. The dividing unit divides a geographical area into a plurality of grids. The obtaining unit obtains a target object and attribute information corresponding to the target object. The attribute information of the target object may include geographical location attribute information. The first determining unit determines a grid corresponding to the target object in accordance with the geographical location. The calculating unit calculates a respective popularity value of each grid in accordance with respective one or more target objects corresponding to a respective grid. The second determining unit determines a set of grids in accordance with the popularity value of each grid and a distance between each grid. The forming unit determines the active area in accordance with the set of grids.

According to the present techniques of the present disclosure, the server associates the target objects with their corresponding grids in accordance with data of geographical locations of the target objects. The server also use the attribute information of the target objects in the grids to calculate the popularity values of the grids, generate the set of grids according to the popularity values, and form the active area according to the set of grids. Based on the present techniques, the server may objectively determine the active area in accordance with the obtained information, thereby avoiding partially determining the active area under the conventional manual techniques and increasing the accuracy of determining the active area. When the server searches the active area after receiving the search request, the server objectively determines the active area based on the obtained information, thereby decreasing a number of search times at the server, avoiding the wasting of resources and bandwidth of the server, and improving the accuracy and reliability of searching the active area.

DETAILED DESCRIPTION

In order to improve the accuracy and reliability for determining an active area, a first example embodiment of the present disclosure provides an example method and server for determining the active area. The present techniques may apply in a process when a user browses a web map and needs to obtain the active area. The present techniques may be implemented as a method or a product. The example embodiments of the present disclosure are described as follows with reference to the accompanying FIGs. It should be understood that the example embodiments as described herein are only used to illustrate and explain the present disclosure and are not used to limit the present disclosure. The example embodiments of the present disclosure and the characteristic features thereof may be combined or referenced to each other when there is no conflict.

The following describes the first example embodiment of the present disclosure. The first example embodiment of the present disclosure provides an example method for determining an active area, which may improve an accuracy and reliability of determining the active area.

The example method for determining the active area in the first example embodiment needs geographical location data of target objects and attribute information corresponding to the target objects. The geographical location data is used to determine a specific position of a respective target object. For example, the geographical location data may be one of the following including an address, a zip code, a longitude or latitude of the target object, and a combination thereof. The geographical location may uniquely correspond to the respective target object. For example, with respect to a target object called "Huanglong Food Store," a corresponding address is "Number Y, X Street, Xihu District, Hangzhou City," a corresponding longitude and latitude are: 120.2E and 30.3N, and a corresponding zip code is 100000. The attribute information corresponding to the target object may be basic information of the target object. For example, the attribute information of the target object may include one of the following including name attribute information of the target object, introductory attribute information of the target object, category attribute information of the target object, and a combination thereof. The name attribute information of the target object may further include an alias name of the target object or a branch name. For instance, if the target object has a name "Huanglong Food Store," the corresponding name attribute information is "Huanglong Food Store," and the corresponding categorical attribute information is "Restaurant."

In the example embodiment, the geographic location data may be transmitted into a geographic location database and the attribute information may be transmitted into an information database. The geographic location database and the information database may locate at a same server or different servers.

Figure 1:
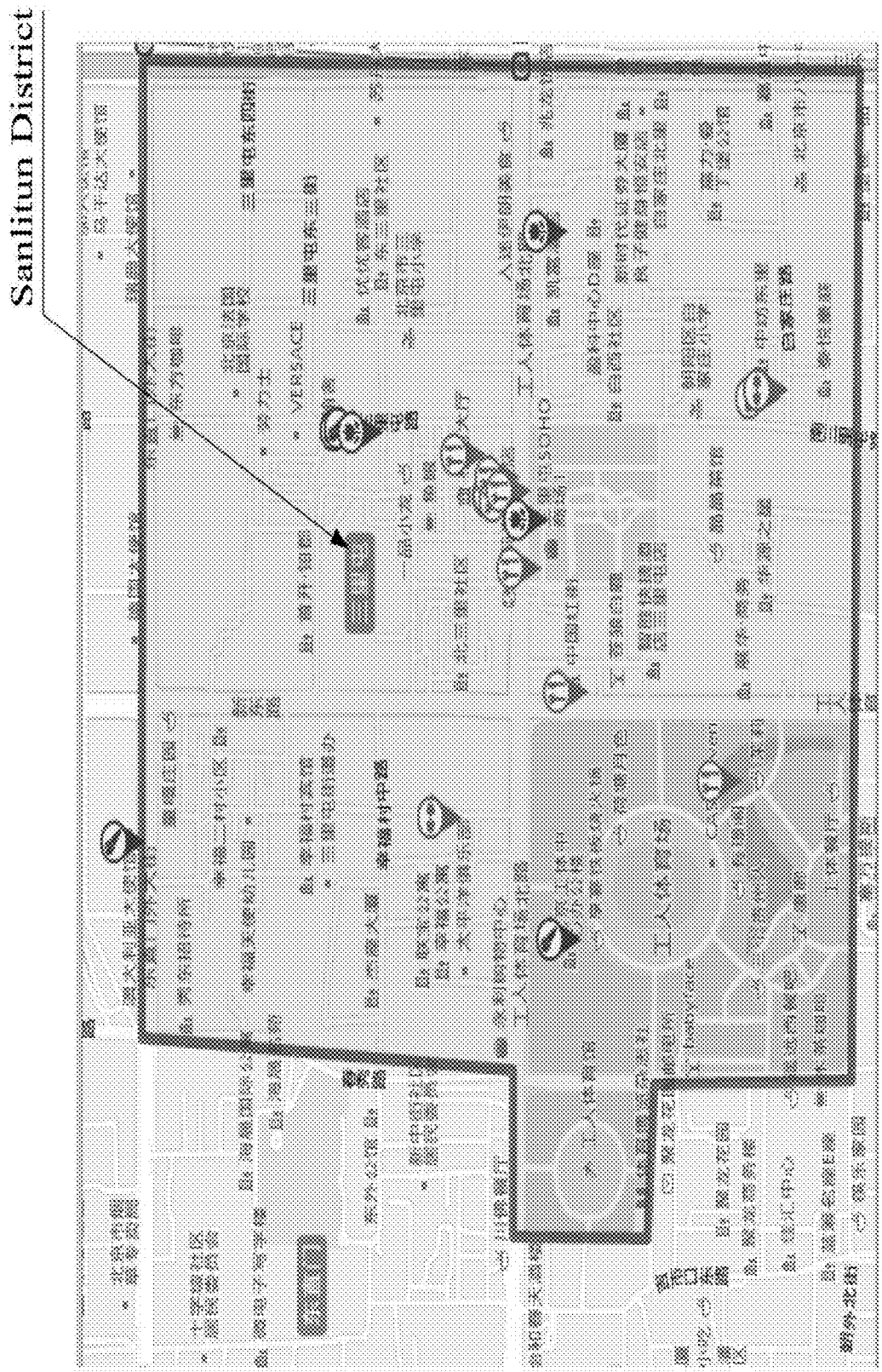
FIG. 1 is a schematic diagram of determining an active geographic range according to the conventional techniques.
Figure 2:
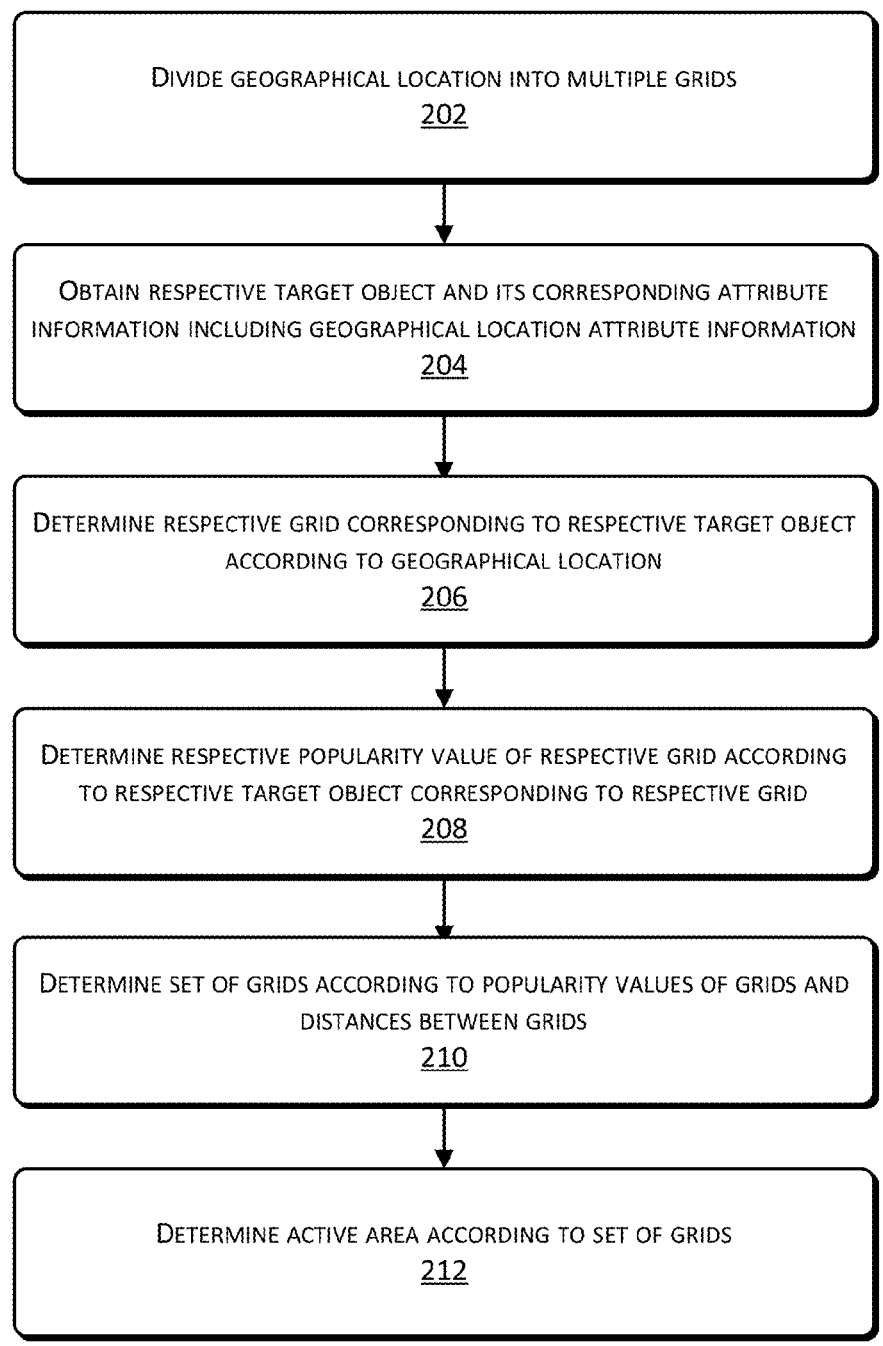
FIG. 2 is a flowchart illustrating an example method for determining an active area according to a first example embodiment of the present disclosure.

FIG. 2 is a flowchart illustrating an example method for determining an active area according to the first example embodiment of the present disclosure. For example, the method for searching the active area may be implemented by a server.

At 202, the server divides a geographical region into a plurality of grids.

For example, the server obtains a map that represents the geographical region, divides the geographical region into the plurality of grids, and assigns levels to the plurality of grids.

For instance, the server obtains a map representing Xihu District in Hangzhou City of China, and divides the geographical region of Xihu District, Hangzhou City into a plurality of grids according to a predetermined size. The grids may have different shapes such as a square, a triangle, or a trapezoid. The geographical region of Xihu District, Hangzhou City may be initially considered as a large grid with a level of 0 before the division. The geographical region is divided horizontally and vertically into four grids with a level of 1. Each grid with a level of 1 is further divided. In the example embodiment, the geographical region may be divided into the plurality of grids with different levels. For example, a grid with a level of 17 corresponds to an area of about 275*237 square meters and a grid with a level of 14 corresponds to an area of about 2200*1896 square meters. The coverage area of each grid after the division may be equal or different. In the example embodiment, a first grid and a second grid are used as examples for illustration.

It should be understood that, in the example embodiment, a grid with a level of 17 is one with a lowest level and has a smallest coverage area. The coverage areas of the grids are gradually increased when the levels of the grids are gradually increased.

For example, the map of the present disclosure, which represents a geographical region, may be a global map or a map only illustrating a region. There are multiple methods for dividing the geographical region into the plurality of grids. The example embodiment applies a tile map dividing method. The present disclosure does not impose any restriction to the dividing methods.

At 204, a target object and attribute information corresponding to the target object are obtained. The attribute information of the target object may include geographical location attribute information.

For example, the server, according to a range of geographical regions, obtains geographical location data and corresponding attribute information of the target object that is within the geographical region from the geographical location database and the information database.

For instance, the geographical region is Xihu District, Hangzhou City. The server obtains geographical location data and corresponding attribute information of target objects in Xihu District. For instance, the Xihu District may have multiple target objects such as "Huanglong Food Restaurant," "Huanglong Century Plaza," "Shopping Mall," etc. The server obtains from the geographical location database the geographical location of "Huanglong Food Restaurant," "Huanglong Century Plaza," and "Xihu Shopping Mall" such as their addresses, zip codes, longitudes, latitudes, etc. The server obtains from the information data base the attribute information of "Huanglong Food Restaurant," "Huanglong Century Plaza,", and "Xihu Shopping Mall," such as their name attribute information, introductory attribute information, categorical attribute information, etc. The obtained data are shown in Table 1 and Table 2 for example.

TABLE 1

Geographical Location Data

| Target object | Address | Zip code | Longitude & Latitude |
| --- | --- | --- | --- |
| Huanglong Food Restaurant | Number Y, X Street | 100000 | 120.2E, 30.3N |
| Huanglong Century Plaza | Number Y, X Street | 100001 | 120.4E, 30.5N |
| Xihu Shopping Mall | Number Y, X Street | 100002 | 121.4E, 31.5N |

TABLE 2

Attribute Information

| Target object | Name Attribute | Introductory Attribute | Categorical Attribute |
| --- | --- | --- | --- |
| Huanglong Food Restaurant | Huanglong Food Restaurant | Night market | Food |
| Huanglong Century Plaza | Huanglong Century Plaza | Entertainment | Entertainment |
| Xihu Shopping Mall | Xihu Shopping Mall | Shops and supermarkets complex | Service |

At 206, a grid corresponding to the target object is determined in accordance with the geographical location.

For example, the server associates the target object corresponding to the geographical location data with the corresponding grid.

When the geographical location of the target object is within a range of the current grid, the target object having the geographical location data belongs to the current grid. When the geographical location of the target object is not within the range of the current grid, the target object having the geographical location belongs to another corresponding grid.

As shown in Table 1 and Table 2, the specific address of the "Huanglong Food Restaurant" is Number Y, X Street, Xihu District, Hangzhou City, and the corresponding longitude and latitude are 120.2E and 30.3N. According to the grids divided by the server at 202, using the first grid as the example, the server will determine whether the "Huanglong Food Restaurant" is within the range of the first grid according to the specific address and the corresponding longitude and latitude of "Huanglong Food Restaurant." When the specific address and the corresponding longitude and latitude of "Huanglong Food Restaurant" are within the range of the first grid, the server will associate the "Huanglong Food Restaurant" with the first grid. Similarly, the server will associate the "Huanglong Century Plaza" and "Xihu Shopping Mall" with their corresponding grids. In this example, both "Huanglong Century Plaza" and "Xihu Shopping Mall" belong to the first grid.

At this step, after the target objects are associated with the corresponding grids in accordance with the geographical locations of the target objects, a number of the target objects in each grid is respectively calculated. For example, it is calculated that there are 340 target objects in the first grid and 200 target objects in the second grid. The calculated number of target objects in each grid will be used in the following steps for calculating a popularity value of each grid.

At 208, a respective popularity value of each grid is calculated in accordance with one or more respective target objects corresponding to a respective grid.

For example, the server calculates a popularity value of each grid according to the target objects belonging to each grid.

For instance, the attribute information of the target object may include category attribute information of the target object. The server may calculate the popularity values of the grid according to the category attribute information and the calculated number of target objects in the grid.

After the target objects are associated with the corresponding grids according to the geographical locations of the target objects, the number of the target objects in each grid will be calculated. The target objects in any grid will be categorized according to the category attribute information of the target objects. A weight value is assigned to each category based on a result of categorization. By using the number of target objects in the same category and the weight values of different categories, the popularity value may be calculated as:

$$H = \sum_{i=1}^{n} P_i C_i \tag{1}$$

$P_i$ is the number of the target objects in the respective category i, and $C_i$ is the weight value assigned to the respective category i.

For example, in the first grid, the category attribute information of "Huanglong Food Restaurant" is food, the category attribute information of "Huanglong Century Plaza" is entertainment, and the categorical attribute information of "Xihu Shopping Mall" is service. Meanwhile there are 340 target objects in the first grid. The server calculates that there are 80 target objects in the category of food, 60 target objects in the category of entertainment, and 200 target objects in the category of service. In other words, the total of 340 target objects are categorized into three categories base on the category attribute information and the number of target objects of each category are P1=800, P2=60, and P3=200. The server assigns weight value to each category of target objects. For example, the weight value of food is $C1=0.6$, the weight of entertainment is $C2=0.3$, and the weight of service is $C3=0.1$. According to the formula (1), the popularity value of the first grid is calculated as $H=86$. Similarly, the popularity value of the second grid is calculated as $H=84$. The server will continue to calculate the popularity value of the other grids until the popularity values of all grids are calculated respectively.

For another example, the attribute information of the target object may include transaction attribute information of the target object. For instance, the transaction attribute information may include comments number information, good rate ratio information, transaction amount information, product sales volume information, etc.

The server obtains the transaction attribute information of all target objects in the grid, conducts statistics of the comments number information, good rate ratio information, transaction amount information, product sales volume information included in the transaction attribute information, and assigns a respective weight value to each information type. By using the transaction attribute information of the target objects, the popularity value may be calculated as:

$$H = \sum_{i=1}^{n} A_i Z_i + p \quad (2)$$

$A_i$ is the respective weight value of the respective information type i included in the transaction attribute information. $Z_i$ is a number of the respective information type i included in the transaction attribute information. p is a regression coefficient.

For example, in the first grid, after the server obtains the transaction attribute information of all target objects and analyzes the transaction attribute information, the server calculates the number of comments number information, good rate ratio information, transaction amount information, product sales volume information included in the transaction attribute information and assigns a respective weight value to each information type. For instance, the number of comment number information is $Z1=400$, the number of good rate ratio information is $Z2=350$, the number of the transaction amount information is $Z3=2200$, and the number of the product sales volume information is $Z4=1100$. The server assigns the weight value to each information type according to the information type. For instance, the weight value of the comment number information is $A1=0.013$, the weight of the good rate ratio information is $A2=0.1$, the weight of the transaction amount information is $A3=0.0167$, and the weight of the product sales volume information is $A4=0.011$. The regression coefficient is $p=-0.84$. According to the formula (2) to calculate the popularity value of the first grid, the popularity value of the first grid is $H=88.2$. Similarly, the server will continue to calculate popularity values of the other grids until the popularity values of all grids have been calculated.

The present disclosure provides example method for calculating the popularity value of the grids. However, the methods for calculating the popularity values of the grids are not limited by the above two examples.

Figure 3:
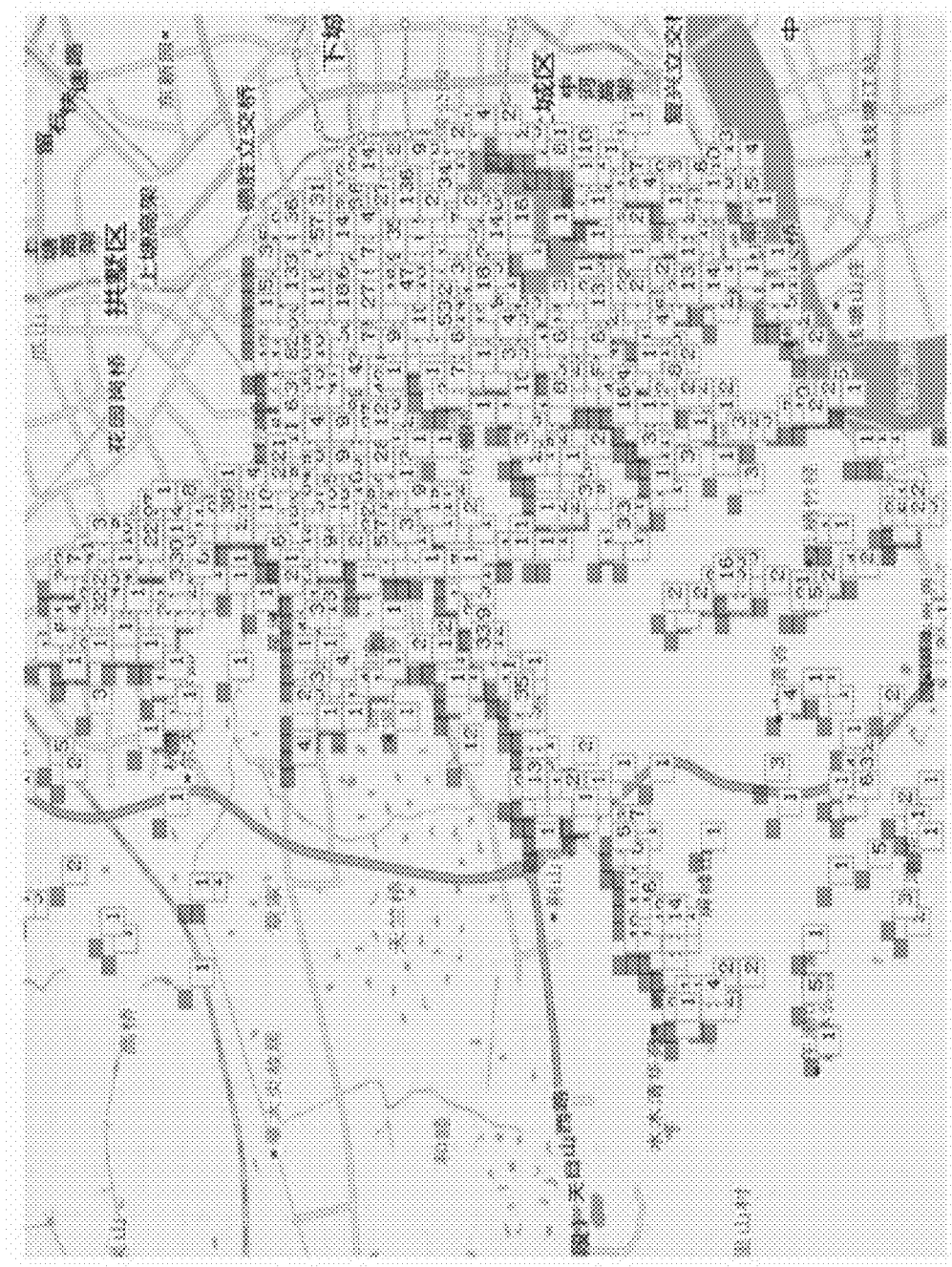
FIG. 3 is a schematic diagram illustrating a distribution of grids according to an example embodiment the present disclosure.

As referring to FIG. 3, it shows a schematic diagram illustrating a map with divided grids. In FIG. 3, the popularity values of the grids have been calculated. The map illustrated in the FIG. 3 is Xihu District, Hangzhou City, and the numbers in the squares are the popularity values of the grids that are located on the upper left corner of the squares.

At 210, a set of grids is determined in accordance with the popularity value of each grid and the distance between each grid.

For example, after the popularity values of all grids are calculated by the server, the server determines the set of grids according to the popularity value of each grid and the distance between each grid.

After the popularity values of all grids are calculated by the server, the server ranks the popularity value of each grid and determines whether the popularity value of each grid exceeds a popularity threshold value. When a popularity value of a grid exceeds the popularity threshold value, the server determines whether the grid exceeds a range threshold value. When the grid does not exceed the range threshold value, the server generates the set of grids by using the grids that exceed the popularity threshold value and do not exceed the range threshold value.

In the example embodiment, the popularity threshold value and the range threshold value may be preset. For example, the value of popularity threshold value may be set at 80, and the value of range threshold value may be set at 1000 meter. The popularity threshold value is used to collect the grids that have higher popularity values to generate the set of grids and to further form the active area. The range threshold value is used to limit the range of the set of grids and to thus limit the range of the active area, thereby preventing the area range from being too large.

For instance, the popularity value of the first grid is $H=86$, and the popularity value of the second grid is $H=84$. The popularity values of both of the grids exceed the popularity threshold value. It is then further determined whether the first grid and the second grid exceeding the range threshold value 1000 meter. In this example, the first grid and the second grid are both within the range threshold value and thus the first grid and the second grid from the set of grids.

At 212, the active area is determined in accordance with the set of grids.

The active area may be determined according to the obtained set of grids.

For example, according to the operations at 208, after determining the set of grids, the server may further calculate the level of the set of the grids to determine whether the level of the grids is equal to a preset level. When the calculated level is equal to the preset level, the set of grids is determined as the active area.

In the example embodiment, a restricted level of the set of grids is preset. For instance, the preset restricted level of the set of grids may be 14. The restricted level of the set of grids is used to limit the scope of the set of grids to prevent the area range of the active area from being too large.

It should be noted that, in the example embodiment, the lower the value of the level of the grid is, the higher the level of the grid is. For example, the level 17 refers to the lowest level of the grid. The level of grid of level 16 is higher than that of level 17 and so on.

For example, the levels of the first grid and the second grid are both 17 and the level of the set of grids generated by the first grid and the second grid is 16. The server calculates that the level of the set of grids is 16 and determines whether the level of the set of grids is equal to the restricted level 14. In this example, the level of the set of grid is smaller than the restricted level and thus the set of grids is generated continuously until the level of the set of grids reaches 14. The set of grids with level 14 is determined as the active area. Meanwhile, it also indicates that the area range of the active area is the area range covered by the set of grids with level 14.

For example, the server may further verify the generated set of grids each time after the set of grids is generated to identify whether the generated set of grids is valid. If the generated set of grids is valid, the set of grids may be continuously generated.

In the example embodiment, a difference threshold of the grid may be preset. For instance, the difference threshold of the grid may be set at 5.

For example, after the set of grids is generated by merging the first grid and the second grid, the server calculates that the level of the set of grids is 16. The server verifies whether the level difference between the set of grids and the grid exceeds the difference threshold value. In this example, the level of the set of grids is 16, and the level of the grid is 17. The difference between the level of the set of grids and the level of the grid does not exceed 5. Thus, the set of grids merged by the first grid and the second grid is determined as valid, and the merging process may be continued.

Figure 4:
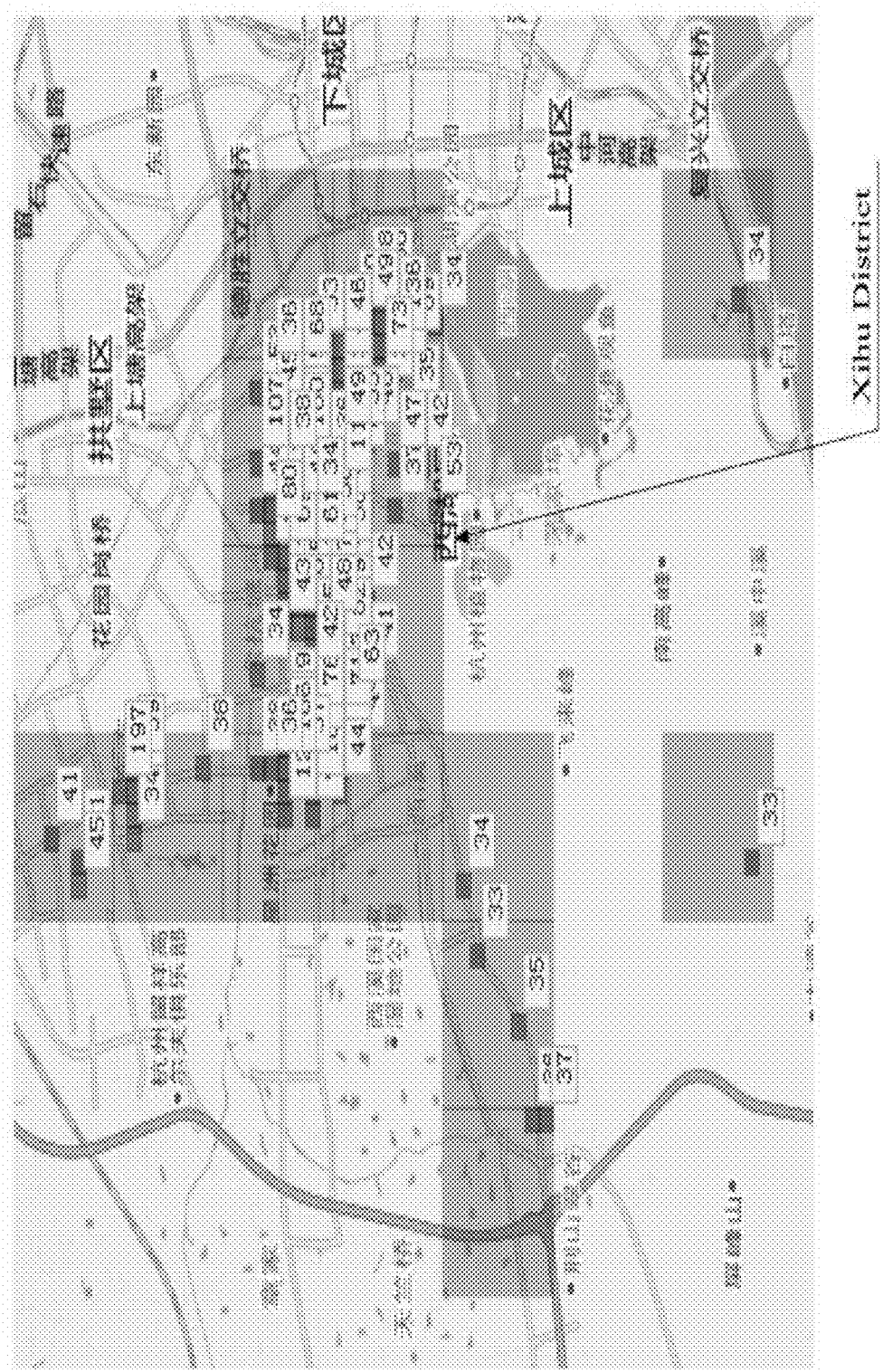
FIG. 4 is a schematic diagram of determining an active area according to the example embodiment of the present disclosure.

FIG. 4 shows a schematic diagram of an example active area. FIG. 4 shows a schematic diagram for determining the active area. The active area shown in FIG. 4 is the active area of Xihu District, Hangzhou City after multiple times of mergers. As shown in FIG. 4, the square shape is an active area that is formed by the processes of merging. The number in the square represents the popularity value of the grid that is located on the upper left corner of the square.

According to the present techniques of the present disclosure, the server associates the target objects with their corresponding grids in accordance with the geographical location data of multiple target objects. The server also uses the attribute information of the target objects in the grids to calculate the popularity values of the grids, generates the set of grids according to the popularity values, and forms the active area according to the set of grids. Based on the present techniques, the server may objectively determine the active area in accordance with the obtained information, thereby avoiding partially determining the active area under the conventional manual techniques and increasing the accuracy of determining the active area.

For example, the process of determining the active area is detailed in the first example embodiment. After the active area is determined, the server may further perform operations of determining a name of the active area. The server selects name attribute information of target objects that frequently occur in the active area, and calculates name values of the name attribute information. The server determines name attribute information with a largest name value as the name of the active area. Thus, the present techniques name the active area. As the active area is named, when different users search the same active area, it is convenient for the server to conduct search to increase the searching accuracy and the searching speed.

The following describes a second example embodiment of the present disclosure.

Figure 5:
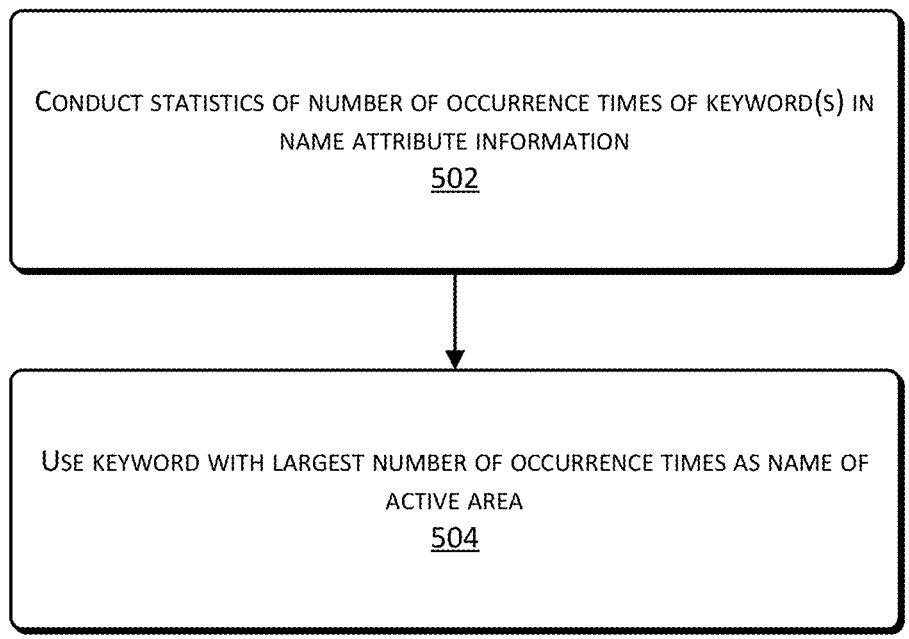
FIG. 5 is a flowchart illustrating an example method for naming the active area according to a second example embodiment of the present disclosure.

FIG. 5 illustrates a flow chart of an example method for naming the active area in accordance with the second example embodiment of the present disclosure.

At 502, the server conducts statistics of a number of occurrence times of one or more keywords in the name attribute information.

For example, the server obtains the attribute information of the target objects in the active area that is formed in the first example embodiment as described above. The attribute information of the target object includes the name attribute information of the target object. In other words, the server obtains the name attribute information in the attribute information of the target object. For instance, the name attribute information may include an alias of the target object or a name of branch store.

After the server obtains the name attribute information of the target object, the server calculates the number of times that the one or more keyword in the name attribute information of the target object appearing in the active area.

For example, after the server calculates the number of occurrence times of the name attribute information, the sever may select multiple name attribute information that appear multiple times based on the statistics result, and then calculate the name values of these name attribute information.

For example, the server's conducting statistics of the occurrence times of the name attribute information may include ranking the name attribute information. The number of occurrence times of the name attribute information is ranked in a descending order. Such ranking may easily be used to select the multiple attribute information that occurs frequently, thereby improving the processing speed of the server.

For example, in the example embodiment, the names with large occurrence times in the name attribute information of the target objects are "Wensan Road," "Huanglong," and "Yuquan" respectively. The occurrence times are M1=4457, M2=590, M3=170 respectively. The weight values are assigned to different name attribute information. When the name attribute information includes a term of "Road" or "Boulevard", its assigned weight value is P1=0.035. For instance, if the name attribute information is "Wensan Road," the assigned weight value of the name attribute is P1. When the name attribute information does not include "Road" or "Boulevard", its assigned weight value is Q2=1. For instance, if the name attribute information is "Huanglong" or "Yuquan," its assigned weight value is Q2. The name value of the name attribute information may be calculated by the occurrence times of the name attribute information and the assigned weight values by applying the following formula:

$$Z=M_n Q_n \qquad (3)$$

The server respectively calculates the name value of each name attribute information. $Q_n$ is the assigned weight value to the respective attribute information and $M_n$ is the number of occurrence times of the respective name attribute information.

At 504, a keyword with a largest number of occurrence times is used as the name of the active area.

For example, after the server calculates the name values of the name attribute information, the name values are ranked and the keyword with the largest occurrence times is determined as the name of the active area.

For instance, after the calculation of the server, the name value of "Wensan Road" is Z1=155.99, the name value of "Huanglong" is Z2=590, and the name value of "Yuquan" is Z3=170. According to the calculated name values of the name attribute information, the name attribute information with the largest name value is determined as the name of the active area. In the example embodiment, "Huanglong" is thus determined as the name of the active area.

It should be noted that single name information in the example embodiment is determined as the name of the active area. In other embodiments, multiple name information may be selected as the name of the active area.

The process of determining the active area is detailed in the first example embodiment. The process of determining the name of the active area is detailed in the second example embodiment. After the name of the active area is determined, as the range of the active area is formed by the set of grids, there may still be some discrepancies with respect to the range of the active area. The server may further revise the range of the active area. Through revising the range of the active area, when the user searches the range of the active area, the present techniques improve the accuracy of search at the server and the search hit rate.

Figure 6:
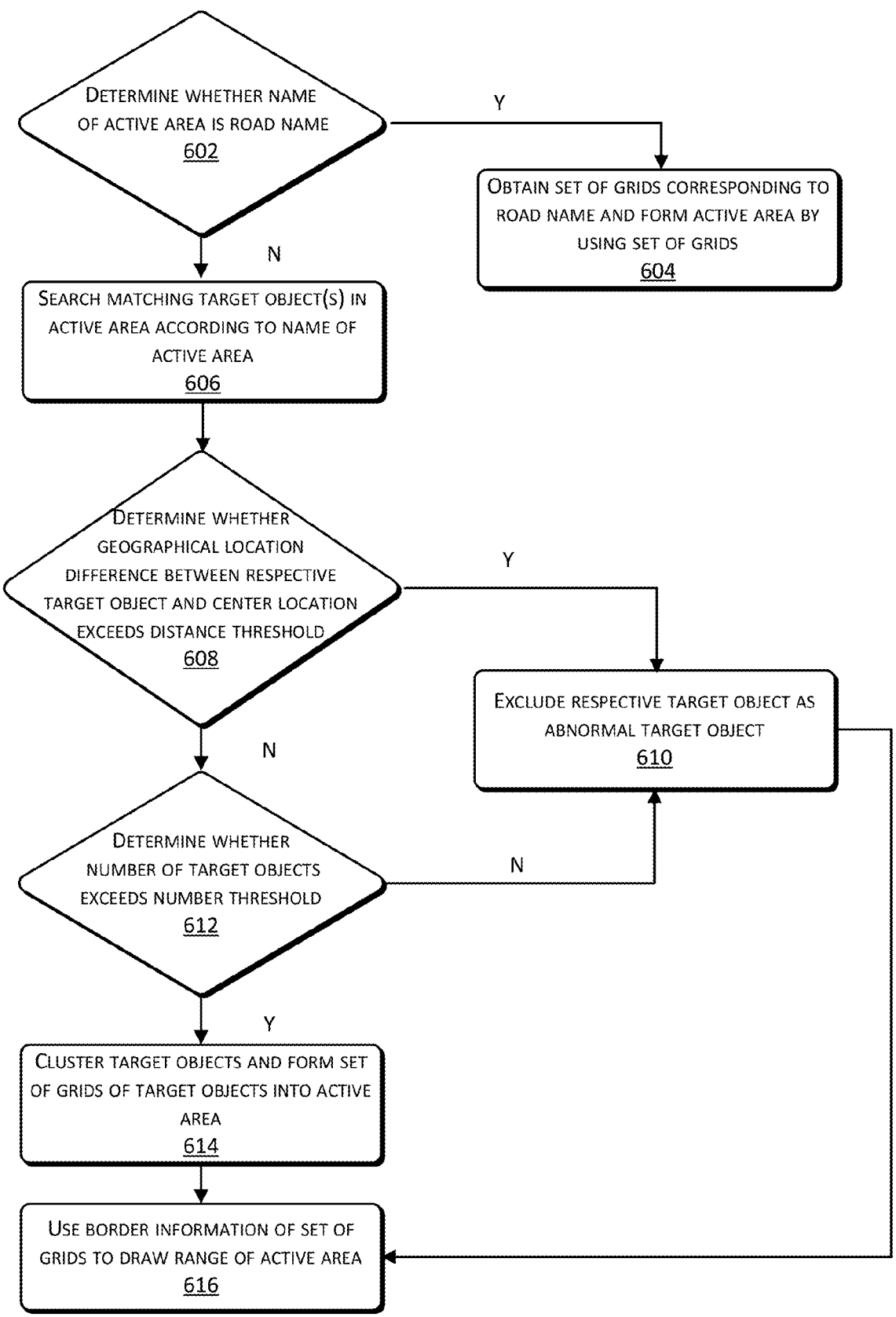
FIG. 6 is a flowchart illustrating an example method for amending the active area according to a third example embodiment of the present disclosure.
Figure 7:
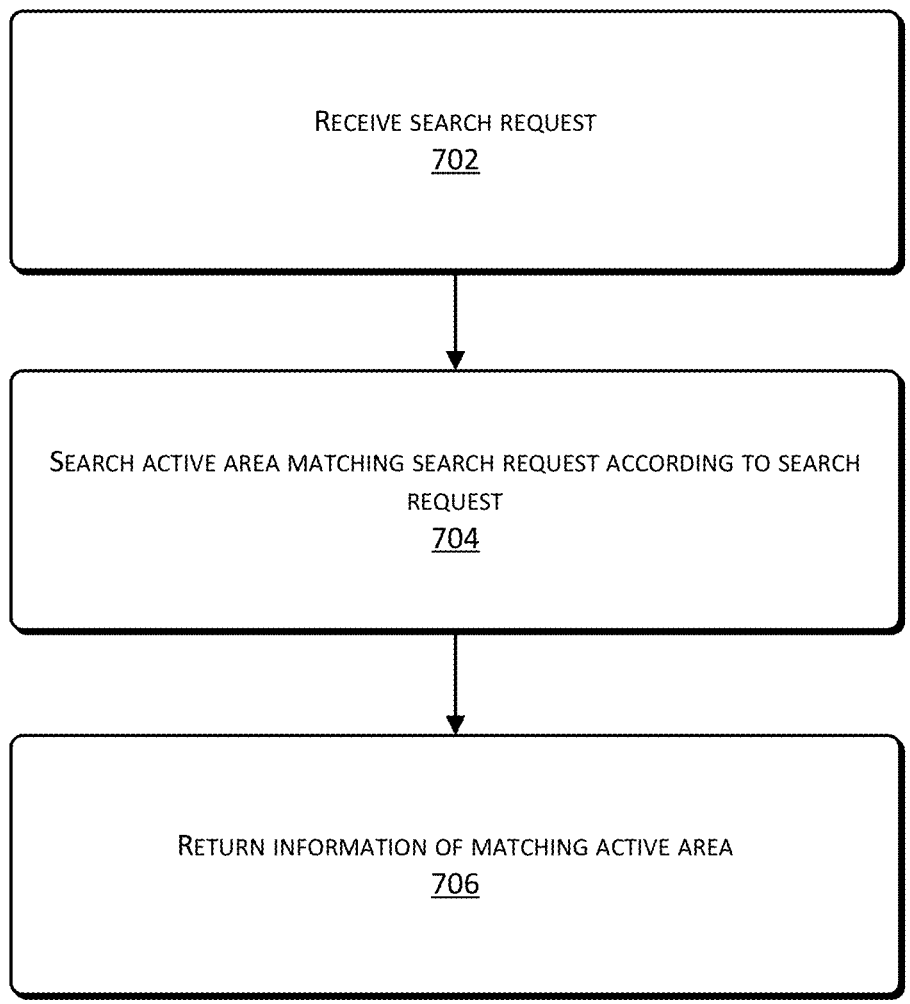
FIG. 7 is a flowchart illustrating an example method for searching the active area according to a fourth example embodiment of the present disclosure.

The following describes a third example embodiment of the present disclosure. FIG. 6 illustrates a flow chart of an example method for revising the active area in accordance with the third example embodiment of the present disclosure.

At 602, the server determines whether the name of the active area is a road name.

For example, after determining the name of the active area, the server determines whether the name of the active area is the road name.

At 604, when the name of the active area is the road name, a set of grids corresponding to the road name is obtained in accordance with the road name. The obtained set of grids is used to form the active area.

For example, when identifying the name of the active area, if the name of the active area is the road name, the set of grids corresponding to the road name is obtained according to the road name. The obtained set of grids forms the active area.

For instance, when the name of the active area is "Wensan Road," the set of grids corresponding to "Wensan Road" is obtained. The range formed by the set of grids corresponding to "Wensan Road" is used as the range of the active area.

At 606, when the name of the active area is not the road name, a matching target object is searched in the active area in accordance with the name of the active area.

For instance, the name of the active area is "Huanglong," which is not the road name. One or more target objects matching "Huanglong" may be searched in the active area according to "Huanglong." In this example, two target objects are searched, which are: "Huanglong Food Restaurant" and "Huanglong Century Plaza."

At 608, a difference between the geographical location data of the target object and the geographical location data of a center location of the active area is determined whether to exceed a distance threshold value.

For example, one target object by another, the server determines whether the distance between the geographical location data of the respective target object and the geographical location data of the predetermined center location of the active area exceeds the distance threshold value.

After the active area is determined in the first example embodiment, the center location of the active area may be also preset. For example, the center location of the active area may be "Wuxin Hotel."

In this example embodiment, the distance threshold value may be preset, such as 500 meters.

For example, the server determines whether a distance between the geographical location of "Huanglong Food Restaurant" and the geographical location of "Wuxin Hotel" exceeds the distance threshold value, and also determine whether a distance between the geographical location of "Huanglong Century Plaza" and the geographical location of "Wuxin Hotel" exceeds the distance threshold value.

At 610, a respective target object is excluded as an abnormal target object when the distance between the respective target object and the center location exceeds the distance threshold value.

For example, when the distance between the geographical location of the target object and the geographical location of the center location exceeds the distance threshold value, it indicates that the target object is far away from the center location of the active area so that the target object is considered as the abnormal target object and is excluded. The present techniques exclude the grids of the abnormal target objects and revise the range of the active area. Thus, when the user searches the range of the active area, the present techniques improve the searching accuracy at the server and the searching hit rate.

At 612, when the distance does not exceed the distance threshold value, it is determined whether a number of the target objects exceeds a number threshold value. At 614, if the number of the target objects exceeds the number threshold value, the target objects are clustered according to a cluster algorithm. The set of grids that the target objects locate forms the active area. If the number of the target objects does not exceed the number threshold value, the target objects are excluded at 610.

For example, if the distance between the geographical location of the target object and the geographical location of the center location of the active area does not exceed the distance threshold value, the present techniques determine whether the number of the target objects exceeds a predetermined number threshold value. When the number of the target objects exceeds the amount threshold value, the target objects are clustered according to a cluster algorithm such as K-means. The set of grids that the target objects locate is merged as an active area. Therefore, the searching accuracy and the searching hit rate of the server are improved when the user searches the range of the active area. When the number of the target objects does not exceed the number threshold value, the target objects are excluded as abnormal target objects and a set of grids that the abnormal target objects locate is excluded. The range of the active area is amended.

The cluster algorithm is a conventional technology and thus is not detailed herein. By using the cluster algorithm, the present techniques collect the scattered target objects and further amend the range of the active area.

In the example embodiment of the present disclosure, according to the operations from 602 to 612 as described above, after the server amends the active area, the server may also use border information of the set of grids that forms the active area to draw or define the range of the active area. When the user searches the range of the active area, the server returns the drawn or defined range of the active area to the user. Therefore, the searching accuracy and the search hit rate of the server may be improved.

At 616, the server uses the border information of the set of grids to define or draw the range of the active area.

For example, after the server performs the operations at 604 or 612, the server obtains the border information of the set of grids that forms the active area and uses the border information of the set of grids to define or draw the range the active area.

For instance, the active area is "Huanglong." The server obtains the set of grids that forms the active area of "Huanglong." There may be one or more sets of grids. When there is one set of grids that forms the active area of "Huanglong," the server obtains enclosed border information of the set of grids and defines or draws the range of the active area by using the border information of the set of grids. When there are multiple sets of grids that form the active area of "Huanglong," the server obtains enclosed and non-overlapping border information of the multiple sets of grids and defines or draws the range of the active area by using such border information.

The above example embodiments describe example methods for determining the active area, determining the name of the active area, and amending the range of the active area. In a practical implementation, the method for determining the active area may be further applied in the method for the user to search the active area. In order to provide a solution that improves the accuracy and reliability of searching the active area, a fourth example embodiment of the present disclosure provides an example method and server for searching the active area. The present techniques may be applied for the processing of obtaining the active area when the user browses a web map. The present techniques may be implemented either as a method or as a product. The following descriptions are described with reference to the accompanied FIGs. It should be understood that the example embodiments as described herein are only for the purpose of illustrating and explaining the present disclosure instead of limiting the present disclosure. The example embodiments of the present disclosure and their characteristic features may be combined or referenced to each other when there is no conflict.

The following describes a fourth example embodiment of the present disclosure that provides an example method for searching the active area. The server searches a matching active area in accordance with a search request of the user.

At 702, the server receives a search request.

For example, the search request may be sent by the user. For instance, when the user just arrives at a city, the user may want to know the active area of the city. A terminal sends the search request to the server in accordance with information inputted by the user. The server receives the search request sent by the terminal.

In the example embodiment, the user wants to obtain a range of an active area of "Xihu District, Hangzhou City" so that the user inputs the range of the active area of "Xihu District, Hangzhou City" in the terminal. The terminal generates the search request in accordance with information inputted by the user and sends the search request to the server. The search request may contain a keyword input by the user or geographical location information of the user's location.

At 704, the active area that matches the search request is searched in accordance with the search request.

For example, the server analyzes the search request after receiving the search request, and obtains the geographical location information or the keyword from the search request to find the active area corresponding to the search request.

For instance, the geographical location information in the search request may include current geographical location information of the user. The current geographical location of the user, for instance, may be "Xihu District, Hangzhou City." The server finds the range of the active area that matches the "Xihu District, Hangzhou City" according to the information "Xihu District, Hangzhou City," such as the active area "Huanglong."

For another instance, the keyword of the search request may include name attribute information of a target object input by the user. For example, the user inputs "Huanglong Food Restaurant." The server then finds the range of the active area that matches the "Huanglong Food Restaurant" in accordance with the input "Huanglong Food Restaurant," such as the active area "Huanglong."

At 706, information of the active area is returned.

For example, after the server finds the range of the active area that matches the geographical location information or the keyword, the server returns the information of the active area to the terminal.

For example, before receiving the search request, the server may determine in advance the active area corresponding to the keyword according to the operations in the first example embodiment of the present disclosure. When the server receives the search request of the user, the server searches the active area corresponding to the search request.

Alternatively, for another example, after receiving the search request, the server determines the active area corresponding to the keyword according to the operations of the first example embodiment of the present disclosure, and returns the corresponding active area to the terminal.

The range of the active area may be determined by the operations of the first example embodiment, the second example embodiment, or the third example embodiment, which is not detailed herein. For example, some operations are described as follows.

A geographical area is divided into a plurality of grids. A target object and attribute information corresponding to the target object are obtained. The attribute information of the target object includes geographical location attribute information. A grid corresponding to the target object is determined in accordance with the geographical location. A respective popularity value of each grid is calculated in accordance with respective one or more target objects corresponding to a respective grid. A set of grids is determined in accordance with the popularity value of each grid and a distance between each grid. The active area is determined in accordance with the set of grids.

As the server determines the corresponding active area through calculation and filtering, the accuracy and reliability of searching are improved.

Moreover, during the process of searching or determining, the server may find or determine ranges of multiple active areas corresponding to the search request. The server may either return information of the multiple active areas to the user or return information of one or more active areas having high rankings in the multiple active areas to the user.

By using the example methods for searching the active area according to the example embodiments of the present disclosure, the server finds the corresponding active area in accordance with the search request, and returns information of the active area. The active area is determined by using attribute information of one or more target objects that belong to a grid to calculate the popularity value of the grid, determining the set of grids according to the popularity value of the grid, and further determining the active area according to the determined set of grids. According to the present techniques, a found active area provided by the server is objectively determined based on the obtained related information, thereby decreasing a searching load of the server, saving the server's resources and bandwidth, and improving the accuracy and reliability of the active area searching.

Corresponding to the example method for determining the active area in accordance with the above example embodiment of the present disclosure, a fifth example embodiment of the present disclosure provides an example server for implementing the method for determining the active area. The example server may improve the searching reliability and searching hit rate.

Figure 8:
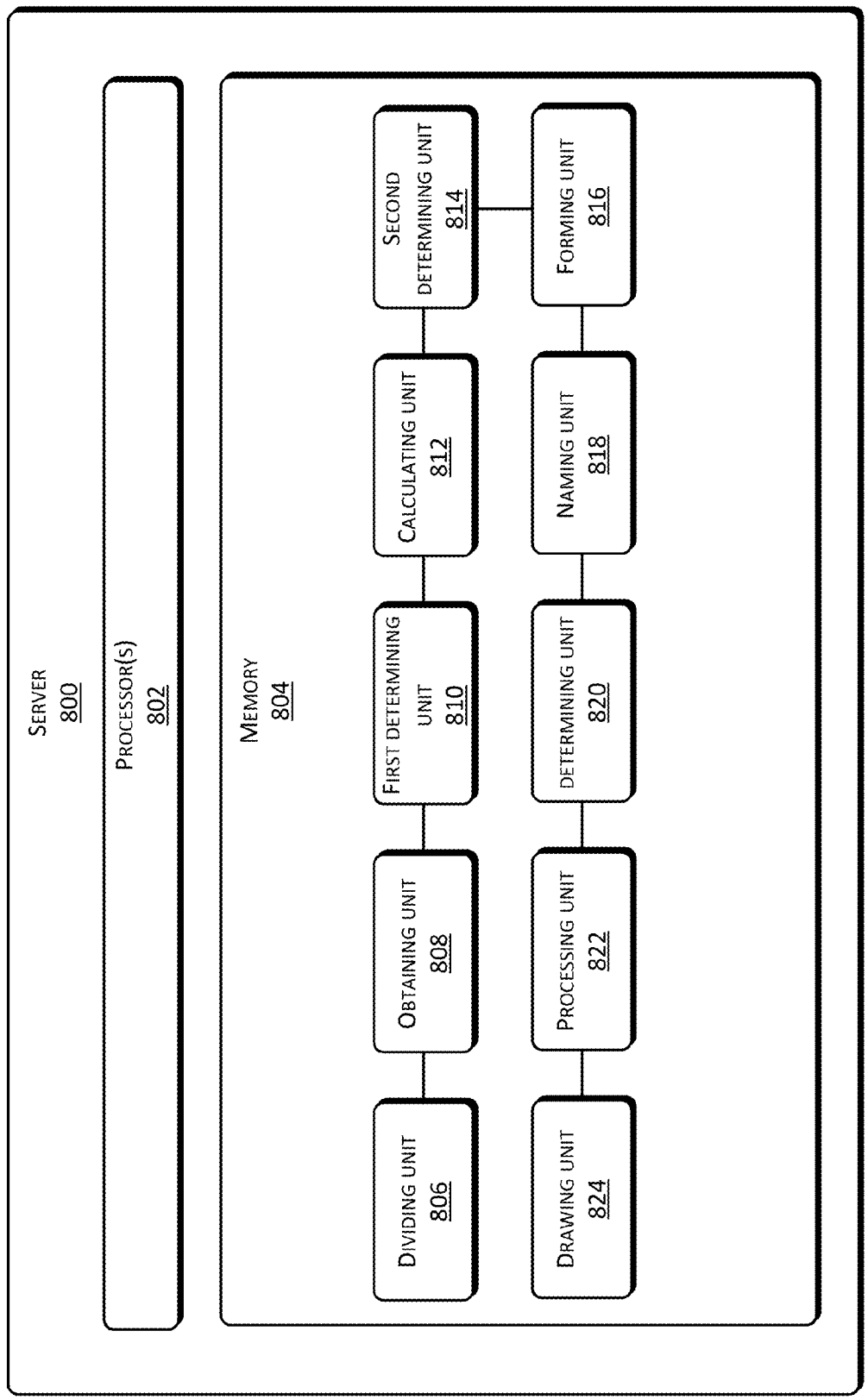
FIG. 8 is a schematic diagram illustrating an example server according to a fifth example embodiment of the present disclosure.

The following describes the fifth example embodiment. FIG. 8 is a schematic diagram illustrating an example server 800 according to the fifth example embodiment of the present disclosure.

The server 800 may include one or more processor(s) 802 and memory 804. The memory 804 is an example of computer-readable media. As used herein, "computer-readable media" includes computer storage media and communication media.

Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 804 may store therein program units or modules and program data.

In the example of FIG. 8, the memory 804 may store therein a dividing unit 806, an obtaining unit 808, a first determining unit 810, a calculating unit 812, a second determining unit 814, and a forming unit 816. The dividing unit 806 divides a geographical area into a plurality of grids. The obtaining unit 808 obtains a target object and attribute information corresponding to the target object. The attribute information of the target object may include geographical location attribute information. The first determining unit 810 determines a grid corresponding to the target object in accordance with the geographical location. The calculating unit 812 calculates a respective popularity value of each grid in accordance with a respective target object corresponding to a respective grid. The second determining unit 814 determines a set of grids in accordance with the popularity value of each grid and a distance between each grid. The forming unit 816 determines the active area in accordance with the set of grids.

For example, the attribute information of the target object may also include the name attribute information of the target object. The server 800 may further include a naming unit 818 stored on the memory 804 that determines a name of the active area in accordance with the name attribute information of the target object in the active area.

For instance, the naming unit 818 may conduct statistics of a respective number of occurrence times of one or more keywords in the name attribute information and determine a keyword with a largest number of occurrence times as the name of the active area.

For another example, the attribute information of the target object may include address attribute information of the target object. The address attribute information may include information of a road name.

The server 800 may further include a determining unit 820 and a processing unit 822 stored on the memory 804. The determining unit 820 determines whether the name of the active area is a road name. The processing unit 822 obtains a set of grids corresponding to the road name in accordance with the road name when the name of the active area is the road name, and forms the active area by using obtained set of grids.

Whether the name of the active area is not the road name, the processing unit 822 searches the matching target object in the active area in accordance with the name of the active area.

The processing unit 822 also determines whether a distance between the geographical location of the target object and a geographical location of a center location of the active area exceeds a distance threshold value. When the difference does not exceed the distance threshold value, the processing unit 822 determines whether a number of target objects exceeds a number threshold value. When the number of target objects exceeds the number threshold value, the processing unit 822 clusters the target objects according to a cluster algorithm. The set of grids where the target objects locate forms the active area.

For another example, the server 800 may further include a drawing unit 824 stored on the memory 804. The drawing unit 824 draws a range of the active area by using border information of each grid in the set of grids.

For another example, the attribution information of the target object may include category attribute information of the target object. The calculating unit 812 classifies the target objects according to the category attribute information, conducts statistics of the number of target objects that have a same category according to the classification result, and assigns a respective weight value to each category. The calculating unit 812 may calculate the popularity value of each grid by applying a formula of $$H = \sum_{i=1}^{n} P_i C_i$$

based on the number of the target objects that have the same category and the weight value of each category.

$P_i$ represents the number of target objects with a respective category i. $C_i$ represents the weight value assigned to the respective category i corresponding to $P_i$.

For another example, the attribution information of the target object may include transaction attribute information of the target object. The calculating unit 812 may obtain transaction attribute information of the target objects in the grid, conduct statistics of the number of information in various information type included in the transaction attribute information, and assign a respective weight value to each information type. The calculating unit 812 may calculate the popularity of the grid by applying a formula of $$H = \sum_{i=1}^{n} A_i Z_i + p$$

based on the number of information in various information type and the respective weight value of each information type. $A_i$ is the respective weight value of each information type included in the transaction attribute information. $Z_i$ is a number of each information type included in the transaction attribute information. p is a regression coefficient.

The second determining unit 814, when there is a grid with a popularity value exceeding the popularity threshold value, generates the set of grids and adds the grid whose popularity value exceeding the popularity threshold value and whose distance with the set of grids does not exceed the distance threshold value into the set of grids.

For example, the second determining unit 814 classifies the geographical region into multiple levels in accordance with a size of the geographic range, calculates a level of the set of the grid, and determines the set of grids as the active area when the calculated level of the set of grids does not exceed a restricted level.

Through the server as described in the example embodiment, the server associates the target objects with their corresponding grids in accordance with the geographical location data of multiple target objects. The server also uses the attribute information of the target objects in the grids to calculate the popularity values of the grids, generates the set of grids according to the popularity values, and forms the active area according to the set of grids. Based on the present techniques, the server may objectively determine the active area in accordance with the obtained information, thereby avoiding partially determining the active area under the conventional manual techniques and increasing the accuracy of determining the active area.

Corresponding to the example method for searching the active area according to the above example embodiments of the present disclosure, a sixth embodiment of the present disclosure provides an example server to implement the method for searching the active area. By using the example server, the searching reliability and the searching hit rate may be improved.

Figure 9:
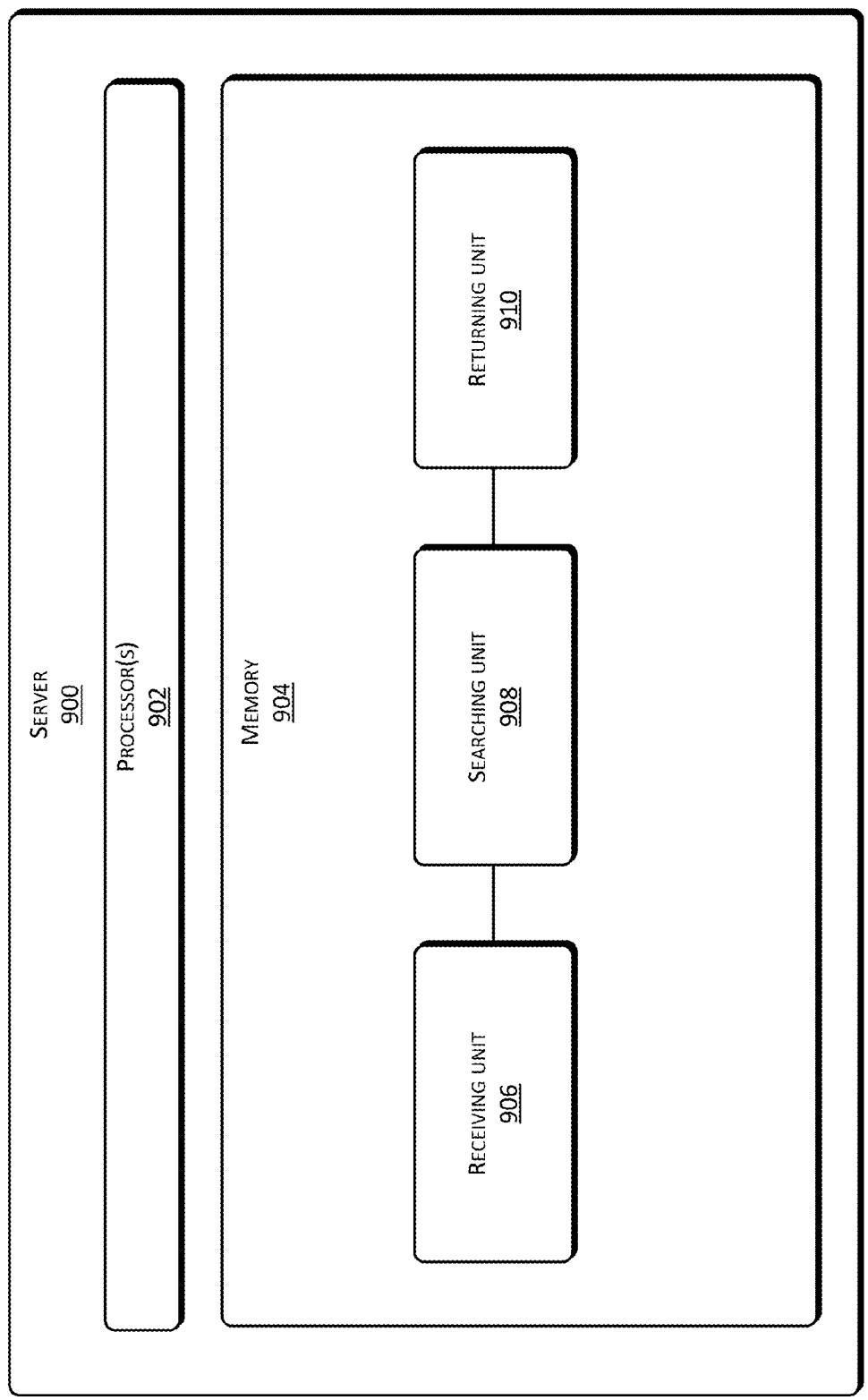
FIG. 9 is a schematic diagram illustrating another example server according to a sixth example embodiment of the present disclosure.

The following describes a six example embodiment of the present disclosure. FIG. 9 is a schematic diagram illustrating an example server 900 according to the sixth embodiment of the present disclosure.

The server 900 may include one or more processor(s) 902 and memory 904. The memory 904 is an example of computer-readable media. In the example of FIG. 9, the memory 904 may store therein a receiving unit 906, a searching unit 908, and a returning unit 910. The receiving unit 906 receives a search request. The searching unit 908 searches an active area corresponding to the search request in accordance with the search request. The returning unit 908 returns information of the corresponding active area.

The server 900 may further include the units in the previous example server (not shown in FIG. 9) and further determine a range of the active area.

For example, the search request may include geographical location information. The searching unit 908 may search the active area corresponding to the geographical location information in accordance with the information of geographical location.

For another example, the search request may include a keyword. The searching unit 908 may search the active area corresponding to the keyword included in the search request in accordance with the search request.

By using the example server for searching the active area according to the example embodiments of the present disclosure, the server finds the corresponding active area in accordance with the search request, and returns information of the active area. The active area is determined by using attribute information of one or more target objects that belong to a grid to calculate the popularity value of the grid, determining the set of grids according to the popularity value of the grid, and further determining the active area according to the determined set of grids. According to the present techniques, a found active area provided by the server is objectively determined based on the obtained related information, thereby decreasing a searching load of the server, saving the server's resources and bandwidth, and improving the accuracy and reliability of the active area searching.

A person with ordinary skill in the art should understand that the units and operations as described in the example embodiments of the present disclosure may be implemented as electronic hardware, computer software, or a combination thereof. To clearly illustrate the exchangeability of hardware and software, the example components and operations are generally described on the basis of functionality in the present disclosure. Whether the functionality is achieved by hardware or software may be dependent on its specific implementation and design constraint. A person with ordinary skill in the art may apply different implementations to realize the described functionality with respect to each specific application. Such implementation should not be considered as beyond the scope of the present disclosure.

The method and the algorithm as described in the example embodiments of the present disclosure may be implemented as hardware, software modules executed by one or more processors, or a combination thereof. The software modules may be stored in random access memory (RAM), internal memory, read only memory (ROM), electrically programmable ROM, electrically erasable programmable ROM, registers, hard disk, removable disk, CD-ROM, or any other form of storage media that is well known in the art.

The example embodiments of the present disclosure illustrate the purpose, the technology solutions, and the advantages of the present disclosure. It should be understood that the above embodiments are only examples and should not be used to limit the present disclosure. Any modification, equivalent replacement, or improvement within the spirit and principle of the present disclosure should be regarded as within the protection scope of the present disclosure.

What is claimed is:

1. A method implemented by one or more computing devices, the method comprising:
   receiving a search request;
   obtaining a map including a geographical region from a geographic location database;
   dividing the geographical region into a plurality of grids;
   obtaining multiple target objects and respective pieces of attribute information from an information database;
   determining a respective grid corresponding to a target object of the multiple target objects based at least in part on a respective piece of attribute information of the target object;
   calculating a respective popularity value of the respective grid in accordance with one or more target objects belonging to the respective grid;
   determining multiple grids in accordance with popularity values of the plurality of grids and a respective distance between each individual pair of the plurality of grids; and
   merging at least some of the multiple grids to form an active area, merging the at least some of the multiple grids to form the active area comprising:
      merging a first grid and a second grid of the multiple grids to generate a set of grids;
      determining a level of the set of grids;
      continuously merging one or more additional grids of the multiple grids to the set of grids until the level of the set of grids reaches a preset level, wherein respective differences between respective levels of the one or more additional grids and the level of the set of grids are less than or equal to a difference threshold; and
      setting the active area as an area range covered by the set of grids in response to determining that the level of the set of grids reaches the preset level;
   searching the active area corresponding to the search request in accordance with the search request; and
   returning information of the active area.

2. The method of claim 1, wherein the search request includes geographical location information, and wherein searching the active area corresponding to the search request in accordance with the search request comprises searching the active area corresponding to the geographical location information.

3. The method of claim 1, wherein the search request includes a keyword, and wherein searching the active area corresponding to the search request in accordance with the search request comprises searching the active area corresponding to the keyword.

4. A method comprising:
  obtaining a map including a geographical region from a geographic location database;
  dividing the geographical region into a plurality of grids;
  obtaining multiple target objects and respective pieces of attribute information from an information database;
  calculating respective popularity values of the plurality of grids based at least in part on the multiple target objects; and
  determining multiple grids based at least in part on the respective popularity values of the plurality of grids;
  merging at least some of the multiple grids to form an active area, merging the at least some of the multiple grids to form the active area comprising:
    merging a first grid and a second grid of the multiple grids to generate a set of grids;
    determining a level of the set of grids;
    continuously merging one or more additional grids of the multiple grids to the set of grids until the level of the set of grids reaches a preset level, wherein respective differences between respective levels of the one or more additional grids and the level of the set of grids are less than or equal to a difference threshold; and
    setting the active area as an area range covered by the set of grids in response to determining that the level of the set of grids reaches the preset level.

5. The method of claim 4, wherein the respective pieces of attribute information include respective pieces of name attribute information of the multiple target objects, and wherein the method further comprises determining a name of the active area according to respective one or more pieces of name attribute information of one or more target objects in the active area.

6. The method of claim 5, wherein determining the name of the active area comprises:
  conducting statistics of a number of occurrence times of one or more keywords in the respective one or more pieces of name attribute information; and
  using a keyword with a largest number of occurrence times as the name of the active area.

7. The method of claim 6, wherein the respective pieces of attribute information further include respective pieces of address attribute information of the multiple target objects, the respective pieces of address attribute information including road name information, and wherein the method further comprises:
  after determining the name of the active area, determining whether the name of the active area is a road name;
  in response to determining that the name of the active area is the road name, obtaining one or more grids corresponding to the road name and revising the active area using the one or more grids.

8. The method of claim 7, further comprising:
  in response to determining that the name of the active area is not the road name, searching one or more matching target objects in the active area in accordance with the name of the active area;
  determining whether a distance between a geographical location of a respective matching target object of the one or more matching target objects and a geographical location of a center location of the active area exceeds a distance threshold value;
  in response to determining that the distance between the geographical location of the respective matching target object and the geographical location of the center location of the active area does not exceed the distance threshold value, determining whether a number of the one or more matching target objects exceeds a number threshold value;
  in response to determining that the number of the one or more matching target objects exceeds the number threshold value, clustering the one or more matching target objects and revising the active area using corresponding one or more grids that the one or more matching target objects are located.

9. The method of claim 8, further comprising: in response to determining that the distance between the geographical location of the respective matching target object and the geographical location of the center location of the active area exceeds the distance threshold value, excluding the respective matching object as an abnormal target object.

10. The method of claim 8, further comprising: in response to determining that the number of the one or more matching target objects does not exceed the number threshold value, excluding the one or more matching target objects as abnormal target objects.

11. The method of claim 4, wherein the respective pieces of attribute information include respective pieces of category attribute information of the multiple target objects, and wherein calculating the respective popularity values of the plurality of grids comprises:
  categorizing the multiple target objects based at least in part on the respective pieces of category attribute information of the multiple target objects;
  conducting statistics of a respective number of target objects with a respective category;
  assigning a respective weight value to the respective category; and
  calculating a respective popularity value of a respective grid of the plurality of grids based at least in part on the respective number of target objects with the respective category and the respective weight value of the respective category.

12. The method of claim 11, wherein calculating the respective popularity value of the respective grid based at least in part on the respective number of target objects with the respective category and the respective weight value of the respective category comprises using a formula $$H = \sum_{i=1}^{n} P_i C_i$$

to calculate the respective popularity value of the respective grid, wherein:
  $P_i$ represents a number of target objects with the respective category i; and
  $C_i$ represents the respective weight value assigned to the respective category i.

13. The method of claim 4, wherein the respective pieces of attribute information include respective pieces of transaction attribute information of the multiple target objects, and wherein calculating the respective popularity values of the plurality of grids comprises:
  obtaining the respective pieces of transaction attribute information of the multiple target objects;
  conducting statistics of a respective number of pieces of information in a respective information type;

assigning a respective weight value to the respective information type; and calculating a respective popularity value of a respective grid of the plurality of grid based at least in part on the respective number of pieces of information in the respective information type and the respective weight value of the respective information type.

14. The method of claim 13, wherein calculating the respective popularity value of the respective grid based at least in part on the respective number of pieces of information in respective information type and the respective weight value of the respective information type comprises using a formula $$H = \sum_{i=1}^{n} A_i Z_i + p$$

to calculate the respective popularity value of the respective grid, wherein:
- $Z_i$ represents the respective number of pieces of information in the respective information type i;
- $A_i$ represents the respective weight value assigned to the respective information type i; and
- p represents a regression coefficient.

15. A server comprising:
one or more processors;
memory;
an information database;
a dividing unit stored in the memory and executable by the one or more processors that divides a geographical region into a plurality of grids;
an obtaining unit stored in the memory and executable by the one or more processors that obtains multiple target objects and respective pieces of attribute information from the information database;
a calculating unit stored in the memory and executable by the one or more processors that calculates popularity values of the plurality of grids based at least in part on the respective pieces of attribute information of the multiple target objects;
a second determining unit stored in the memory and executable by the one or more processors that determines multiple grids based at least in part on the popularity values of the plurality of grids and a distance between each individual pair of the plurality of grids; and
a forming unit stored in the memory and executable by the one or more processors that merges at least some of the multiple grids to form an active area, merging the at least some of the multiple grids to form the active area comprising:
merging a first grid and a second grid of the multiple grids to generate a set of grids;
determining a level of the set of grids;
continuously merging one or more additional grids of the multiple grids to the set of grids until the level of the set of grids reaches a preset level, wherein respective differences between respective levels of the one or more additional grids and the level of the set of grids are less than or equal to a difference threshold; and
setting the active area as an area range covered by the set of grids in response to determining that the level of the set of grids reaches the preset level.

16. The sever of claim 15, further comprising a naming unit stored in the memory and executable by the one or more processors that determines a name of the active area in accordance with respective pieces of name attribute information of a plurality of target objects in the active area.

* * * * *